US006717597B2

(12) United States Patent
Letzelter et al.

(10) Patent No.: US 6,717,597 B2
(45) Date of Patent: Apr. 6, 2004

(54) CONTEXTUAL AND DYNAMIC COMMAND NAVIGATOR FOR CAD AND RELATED SYSTEMS

(75) Inventors: Frederic Letzelter, Palaiseau (FR); Francois Melocco, Boulogne-Billancourt (FR)

(73) Assignee: Dassault Systemes, Suresnes Cedex (FR)

( * ) Notice: Subject to any disclaimer, the term of this patent is extended or adjusted under 35 U.S.C. 154(b) by 476 days.

(21) Appl. No.: 09/738,146

(22) Filed: Dec. 15, 2000

(65) Prior Publication Data

US 2002/0075328 A1 Jun. 20, 2002

(51) Int. Cl.[7] .................................................. G06F 3/00
(52) U.S. Cl. ........................ 345/810; 345/964; 345/854
(58) Field of Search ................................ 345/964, 810, 345/811, 821, 825, 854

(56) References Cited

U.S. PATENT DOCUMENTS

| | | | | |
|---|---|---|---|---|
| 5,345,546 A | * | 9/1994 | Harada et al. ............... | 345/442 |
| 5,461,709 A | * | 10/1995 | Brown ........................ | 345/848 |
| 5,513,310 A | * | 4/1996 | Megard et al. ............. | 345/810 |
| 5,923,573 A | * | 7/1999 | Hatanaka ..................... | 703/2 |
| 6,064,386 A | * | 5/2000 | Felser et al. ................. | 345/629 |
| 6,121,965 A | * | 9/2000 | Kenney et al. ............. | 345/810 |
| 6,219,056 B1 | * | 4/2001 | Felser et al. ................. | 345/848 |
| 6,338,000 B1 | * | 1/2002 | Nakajima et al. ............. | 700/97 |
| 6,346,943 B1 | * | 2/2002 | Thoemmes et al. ......... | 345/443 |
| 6,360,357 B1 | * | 3/2002 | Cesare ........................ | 717/168 |
| 6,556,878 B1 | * | 4/2003 | Fielding ...................... | 700/83 |

* cited by examiner

*Primary Examiner*—Cao (Kevin) Nguyen
(74) *Attorney, Agent, or Firm*—Clifford Chance US LLP

(57) ABSTRACT

A method and system for aiding a user of a graphical object editor in defining inputs for a selected command comprises presenting a navigation console on the display in response to a user selecting a particular command. The navigation console contains information which is contextually related to the selected command and, in particular, shows a sample object having sample features representative of the command inputs and additional features showing the command output using the sample input features. The console display has active regions associated with respective command inputs which cover one or both of a sample feature associated with the respective command input and an icon representative of the respective input. When a user selects an region in the navigation console associated with a particular command input, the command processor state machine is shifted to a state appropriate to receive a definition of a feature in the main object model for use as the particular command input. Similarly, in response to a user defining one input, the state of a navigation state machine can be shifted to highlight element in an active region for a next suitable input to select.

30 Claims, 15 Drawing Sheets

CONTEXTUAL AND DYNAMIC COMMAND NAVIGATOR FOR CAD AND RELATED SYSTEMS

FIELD OF THE INVENTION

The present invention is related to an improved method and system for receiving selections of inputs required for the execution of a command which acts on an object model in a CAD or similar system

BACKGROUND

There exist a large number of computer software applications which permit a user to define a two- or three-dimensional object comprised of a number of object features. Such Computer Aided Design (CAD) and other similar systems, such as CAM and CAE systems, display the object model in a editing window and permit the user to select from a number of different commands which act on to modify or create various features in the object model. Many commands will have one or more required inputs which must be specified by the user before the command can be executed and may also have additional, optional inputs which can be specified. For example, a surface can be created using a "sweep function" which requires the user to select one curve to serve as a "spine" and a second curve to serve as a "profile" which is swept along the spine. Other non-required inputs, such as curves which define additional profiles or guides, can also be specified and are used to vary the manner in which the swept surface is created.

The command specifications to be defined by the user for the various required and optional command inputs require a dialog between the user and the system. In other words, the system must indicate to the user the various inputs which can be specified for the selected command. The user must then select features in the object model, e.g., by mouse clicks, keyboard strokes, or other input mechanisms, indicate which inputs they apply to, and then instruct the application to execute the command using the specified inputs.

When identifying a feature in the object model to use as a parameter for a given command, the system must know both which feature is being selected and which parameter the selected feature applies to. Typically, the user will choose a particular parameter to fulfill, e.g., by selecting that parameter from a pull-down menu, and then select the feature to use in that parameter. The various phases of the parameter specification process are called "command states" and, conventionally, the command processing routine is configured to move from one state to the next as the user makes selections for the various command specifications. In addition, certain commands may have required command state sequences which are followed when the command specifications are being entered and further options may be presented to the user to allow for more information to be entered by the user regarding the execution of the command. The list of states for a particular command is a basic characteristic of that command and each command can be viewed as being encoded as particular command state machine within the program's command processor module. With reference to the sweep example, this command can be implemented, in its simplest form, three command states, one corresponding to a state where the user can specify the profile, a second state where the user can specify a spine, and a third state where the specification is complete and the user can execute the command. More complex commands can have a much larger number of command states.

To aid the user in working through the command specification process, conventional systems employ standard dialog box approach, with or without scrolling menus. When a user selects a command that has a number of options which must be specified, the system displays a selection box which identifies each of the fields and permits the user to fill in various fields with the desire selections. To avoid interfering too much with the object model display, the dimensions of the dialog box must be kept relatively small. As a result, multiple pages of dialog are often required, which pages are typically stacked on each other and must be individually selected by clicking on appropriate buttons or on tabs at the top of the window.

While a dialog box approach is acceptable in some applications, such as word processing applications, in more complex applications, such as computer aided design, this approach suffers from severe drawbacks. One major drawback of conventional dialog boxes used in graphic design applications is that they are generally unrelated to the particular object in the scene. While the specific features which must be selected, such as spine and profile, are generally identified in the dialog, the physical meaning of the various selections is not. Instead, the user is presumed to understand the meaning and purpose of each of the selections which can be made. Although separate help files can be provided by the software manufacturer, they are generally in the form of electronic reference manuals in which the user can look up the meaning of the various inputs. This information is not incorporated in the dialog box itself because the screen space and/or number of dialog box pages required to contain this information is unacceptable to skilled users. Thus, a novice operator entering a command specification may need to access and page through several different help files separate from the dialog box to understand the purpose of the command and the meaning of the various parameters. Similarly, even expert users may need to reference instructional materials when using complex or unfamiliar commands, or when they are familiar with a different software package that provides similar functionality but uses different terminology.

Accordingly, there is a need for an improved method of receiving command specifications from a user which provides a more intuitive and user-friendly interface with the computer system for the selections required in any given situation to complete the command specification in advance of executing the command.

There is a further need for such a system to provide a clear and unambiguous indication of the specifications required by a given command while providing a dialog box that occupies a minimal amount of screen area and overlapping pages.

SUMMARY OF THE INVENTION

These and other needs are addressed by a method and system according to the invention in which a traditional dialog box or menu presentation used to solicit command inputs is replaced with a graphical navigation console (or window) showing icons for various command inputs to be provided by the user along with a background sample object showing a schematic representation of the purpose of the command. Each input icon, which can be a pictogram, text, or a combination of both, is positioned adjacent or otherwise associated with one or more sample features in the sample object so that the overall navigation console presents a sample object to which the command has been applied with each suitable input labeled. As a result, the user can quickly and easily determine the various inputs which must be specified to execute the command and the purpose of those inputs relative to the command's functionality.

The navigation console is not a static display. Instead, it has various active regions, such as the sample features and icons, associated with given command inputs. When an active region in the navigation console is selected, the system automatically shifts the graphic editor's command processor to a command state in which the user can specify the input associated with the active region, e.g., by selecting or manipulating the primary object or other features or elements in the main object scene. Other manipulations of various aspects in the navigation console are also possible, including moving an icon or feature in the sample model or opening a contextual menu associated with a selected icon or feature.

According to a further aspect of the invention, the system can guide the user in selecting the various parameters for the command by highlighting or otherwise identifying to the user in the navigation console elements in a particular active region, such as the sample features and icon, and placing the command processor in a state to receive a selection for the respective input. When the input definition is provided by the user, the navigation system automatically highlights a region associated with a subsequent command input and places the command processor in an appropriate state to receive a selection for that input.

In situations where command inputs are made by manipulating, as opposed to selecting, an element or feature of the main object, such as an input which requires identification of particular points in the object for reference purposes, a sample icon in the navigation window representative of that option can be selected and "dragged" to the appropriate location on the object in the main screen to activate that feature. In a variation of this configuration, the user can be permitted to slide or drag the representative icon in the navigation window, e.g., along a selected sample curve feature, and the navigation system will translate that action into a corresponding motion of the actual icon along a feature, such as a curve, selected in the main editing system. This is particularly useful when the selected feature may be too complex to directly trace or select various positions in via the main editing screen.

According to yet a further feature, where the selected command permits the user to launch a secondary or sub-command, a contextual menu presented in the navigation console can be provided with options indicating these secondary commands. Upon selection by the user of one of these additional command, the current command can be placed in standby, the selected command launched, and the content of the navigation console subsequently updated to contain the appropriate sample object input with active regions appropriate for the inputs of the newly launched command.

Advantageously, the present invention provides a command navigation tool which can be fully associated and integrated with the standard command processing systems. The user can follow the prompts of the navigation system and select command parameters in a predefined sequence. In addition, the user can directly select a sample parameter in the navigation window, which selection will cause the system to revert to the command state corresponding to the parameter or option selected by the user. By providing such a command navigation tool, novice users can more easily understand and visualize the various parameters and options associated with a selected command and directly select those parameters from within the navigation window.

BRIEF DESCRIPTION OF THE FIGURES

The foregoing and other features of the present invention will be more readily apparent from the following detailed description of illustrative embodiments of the invention in which.

DETAILED DESCRIPTION OF THE PREFERRED EMBODIMENTS

Figure 1:
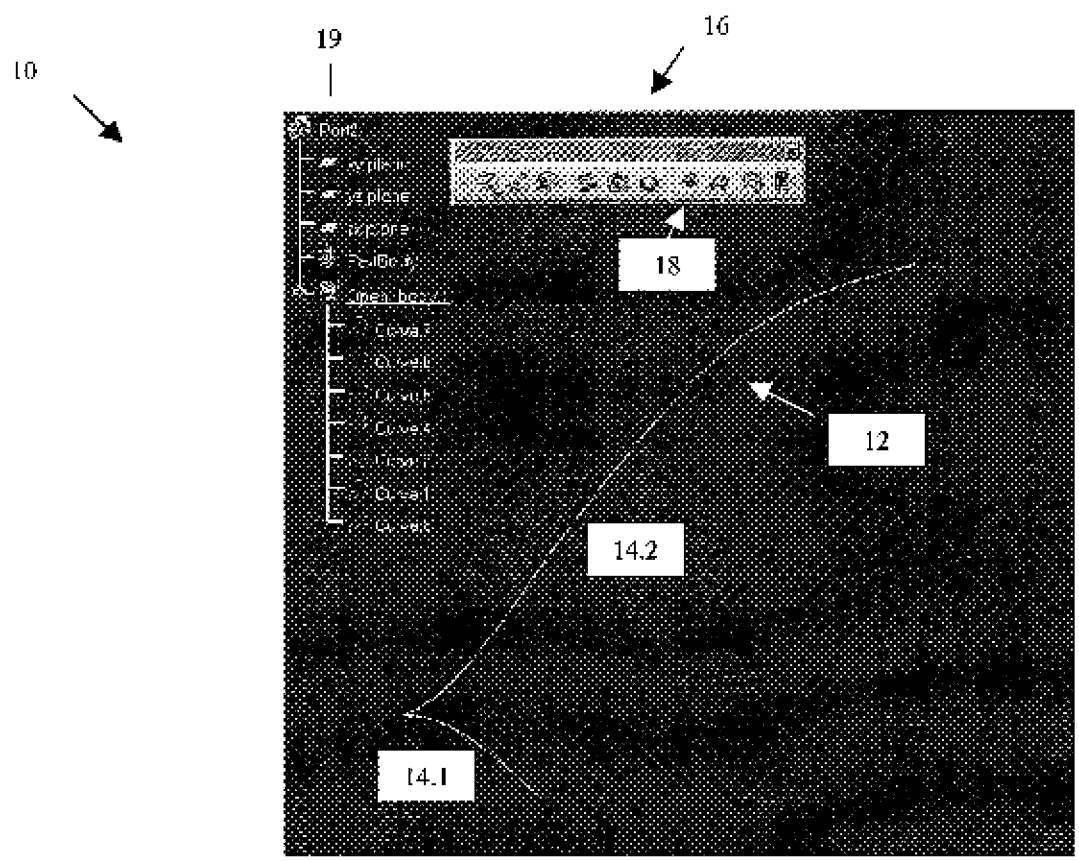
FIG. 1 is an illustration of a conventional CAD editing screen.

Turning to FIG. 1, there is shown a conventional graphic object editing screen 10, such as would be presented in a typical CAD program. The screen 10 shows a geometric model object 12 which is comprised of one or more object features, such as curves 14.1 and 14.2. One or more command selection inputs can also be provided. For example, shown in FIG. 1 is a command menu bar 16 having various menu icons 18 related to surface creation functionality. A standard feature tree representation 19 of the various elements of the object 12 is also illustrated.

Figure 2:
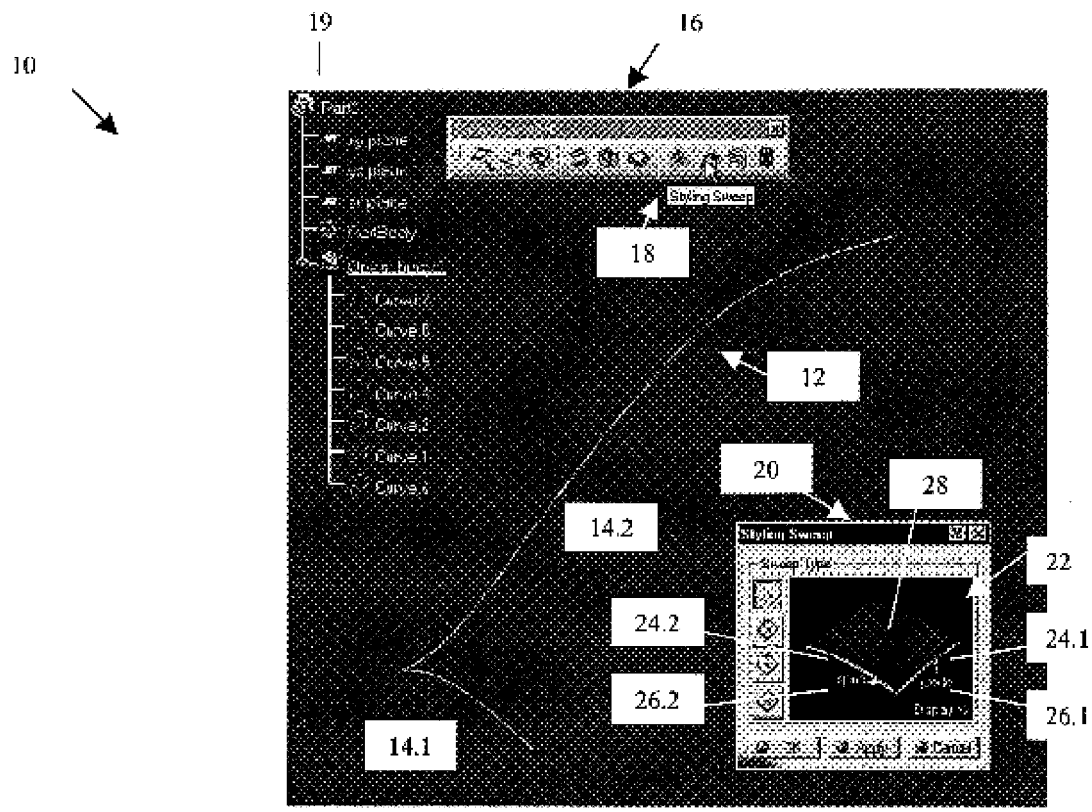
FIG. 2 is an illustration of a CAD editing screen further including a navigation console in accordance with the present invention.

According to the invention, and with reference to FIG. 2, when a user selects a particular command to execute, for example, by indicating that they would like to generate a surface using a "styling sweep" function, a corresponding navigation console 20 (also referred to herein as a navigation window) is displayed on the editing screen which represents navigation functionality that is designed to guide the user in making the required input selections to execute the command. The navigation console 20 includes a sample object image which is configured to form a generic representation of the inputs and functionality of the selected command. The sample object 22 contains features 24.1, 24.2 which are associated with the various command inputs that the user must select in order to execute the command. The sample object can be a predefined background image containing the various features or the image can be dynamically rendered by the graphic program's visualization systems using a sample three-dimensional model comprising the sample features as input. Adjacent or otherwise associated with the sample features are input icons 26.1, 26.2 which indicate which of the various command inputs a given sample feature in the sample object is associated with. The sample object can further contain additional features which illustrate the effect of applying the selected command to the sample object using the sample features as the input parameters indicated by the associated parameter icons.

For example, in FIG. 2, the user has selected a "styling sweep" command to generate a surface. In response to a selection of this command, a contextually appropriate sweep navigation console 20 is displayed over the displayed scene. The selected sweep command requires the user to select as input a spine and a profile to sweep along that spine. Accordingly, the sample object 22 contains a first feature 24.1 which is associated with the profile input, as indicated by the adjacent profile label icon 26.1, and a spine feature 24.2 with associated spine label icon 26.2. Also shown as part of the sample object 22 is a surface 28 which illustrates the effect of applying the sweep function to the selected sample profile and spine curves. By displaying for the selected command some or all of the required inputs and the effect of executing the command with the sample features used as the indicated inputs, a user can quickly and easily identify the command requirements and understand the purpose of those requirements and how they factor into the output of the command.

Figure 3:
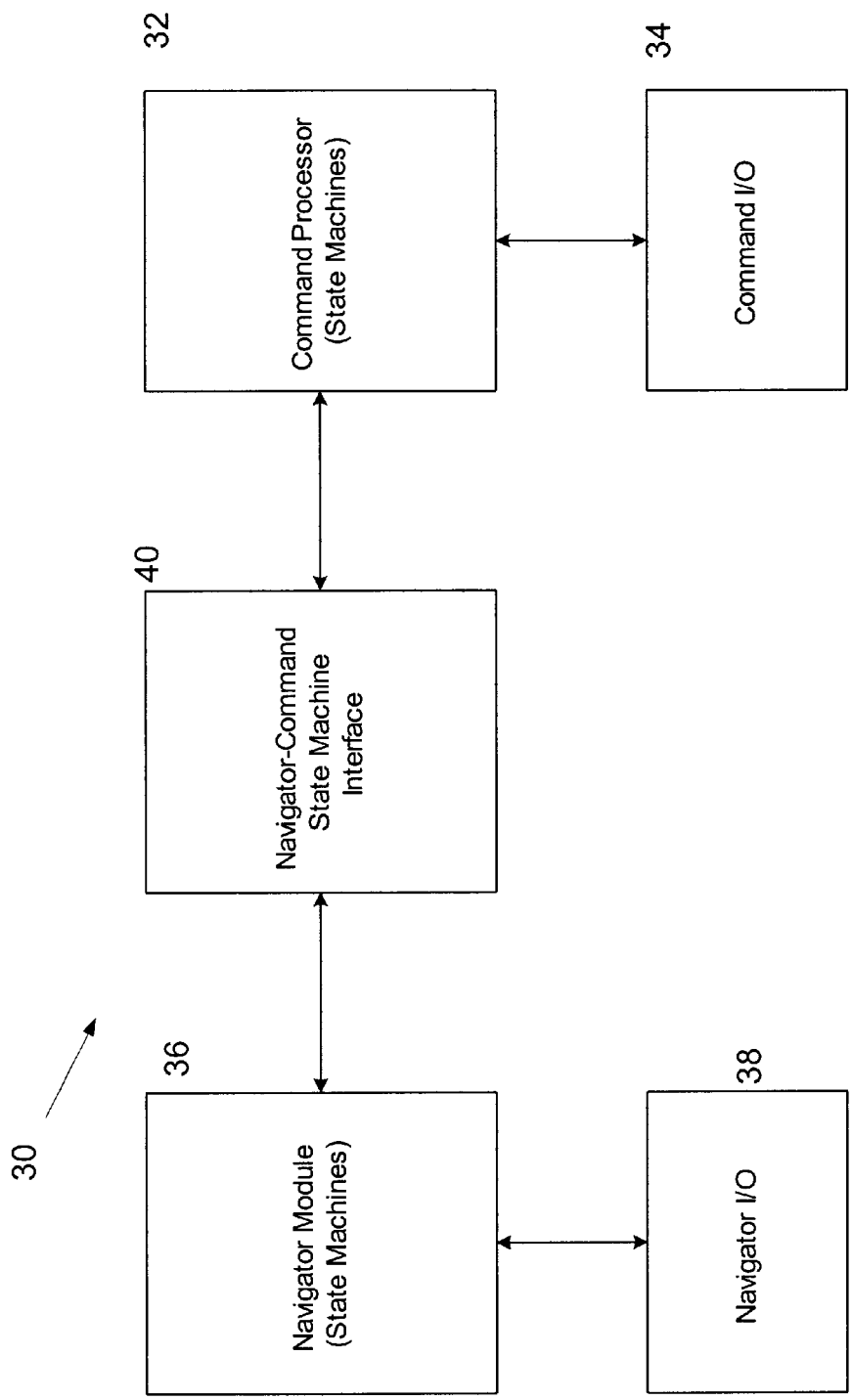
FIG. 3 a system block diagram of the relevant modules in a CAD system implementing the present invention.

Turning to FIG. 3 there is shown a system block diagram of the relevant modules in a graphic editing system 30 implementing the present invention. A command processor module 32 is provided for managing the selection and application of various inputs associated with the commands available in the system. This module is implemented in a generally conventional manner. In a preferred embodiment, the command processor comprises a number of state machines, one for each defined command. The state machine for a given command has a number of states which represent the various program states during which a user can select particular element(s), points, or other features, etc., in the main object to use as inputs for the commands. Such a command state is entered when the user indicates they would like to define the value for the respective input and, when in the state, the program permits the user to make the necessary selection. A command input and output module 34 may be separately provided to interact with the command processor 32 and provide a suitable user interface. Command state machines of this type are well known to those of skill in the art.

The system 30 further contains a navigation module 36 which is configured to provide dynamic and contextual assistance to a user to help the user understand the purpose and functionality of the selected command and identify and understand the purpose of the various inputs to use in that command. In a preferred embodiment, the navigation module 36 comprises one or more navigation state machines and each navigation state machine has a plurality of navigation states which correspond to respective inputs for the command. (Other command states may also be present.) Particular navigation states can be activated by the user by selecting a corresponding active region in the sample object, which active region can contain the sample feature and icon associated with the input corresponding to the navigation state. Alternatively, various navigation states can be activated in sequence according to predefined criteria.

When the navigation state machine is in a state which corresponds to a command input, the command processor state machine position is shifted, if necessary, to place the command processor in the particular command state where the user can provide this input via the main object model. This coordination between the position in the navigation and the command state machines can be provided as part of the state machine functionality itself. Preferably, however, a separate navigator-command state machine interface 40 is provided to monitor the position in the command and navigation state machine and to synchronize state position and progression between states between them. In particular, the state machine interface 40 monitors the transition between various states in the navigation and command state machines. When one of the state machines shifts between states, the interface determines whether the other state machine is in an appropriate corresponding state. If not, the position in the second state machine is changed to the appropriate state.

Figure 4:
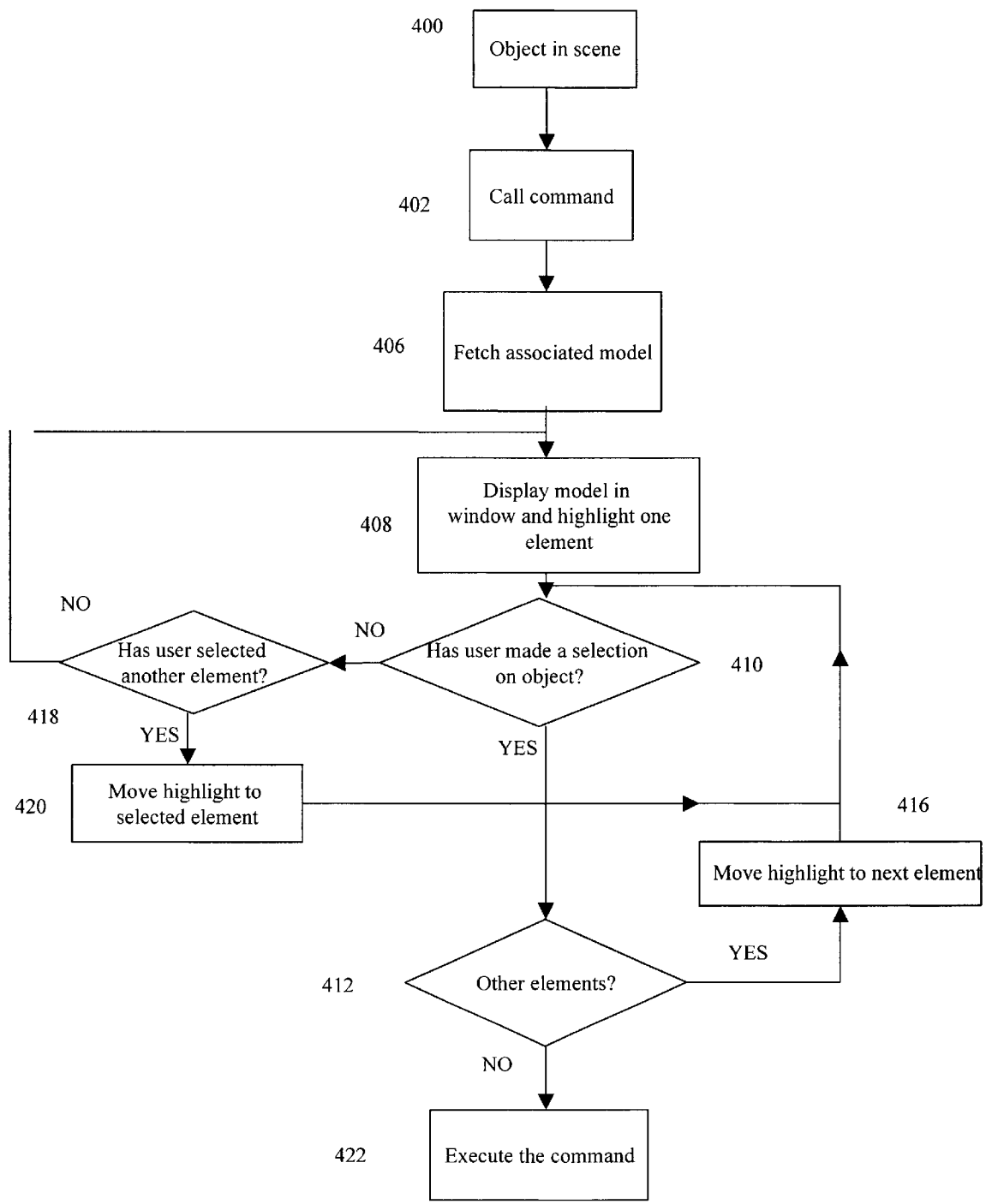
FIG. 4 is a flow chart which summarizes the general flow of an automated command navigation process within the context of a main CAD system editing environment.

FIG. 4 is a flow chart which summarizes the general flow of an automated command navigation process within the context of the main graphic modeling or editing system. Initially, the user creates, places, or edits an object in the main editing screen. (Step 400). The user then selects a command to execute. (Step 402). In response, the navigation module retrieves an appropriate navigation model, including graphical displays or sample objects and a suitable navigation state machines. (Step 406). A navigation window or console is then opened in or on the editing screen and the sample object model is subsequently displayed. In addition, an initial active area in the sample object, such as one or both of a particular feature and an associated input icon, is preferably highlighted. (Step 408). Through the action or under the direction of the navigator command state machine interface 40, the command state machine is placed in a state in which the input corresponding to the highlighted active area can be defined. If the user has identified a feature in the object model to use as the input (Step 410) and additional inputs are required (step 412), the navigation system moves to the next appropriate navigation state and highlights the active area associated with the input corresponding to that next state. (Step 416). (The command state machine is also placed into a corresponding input state). Alternatively, the user can choose a different input by selecting the active area for that input or by making a selecting via the command processor interface. If the user has selected to enter data for another element (Step 418) then the position of the navigation and command state machines are updated accordingly and the appropriate active area is highlighted (Step 420). The process continues until all of the required inputs for the command have been specified, after which the command can be executed (Step 422).

Figure 5:
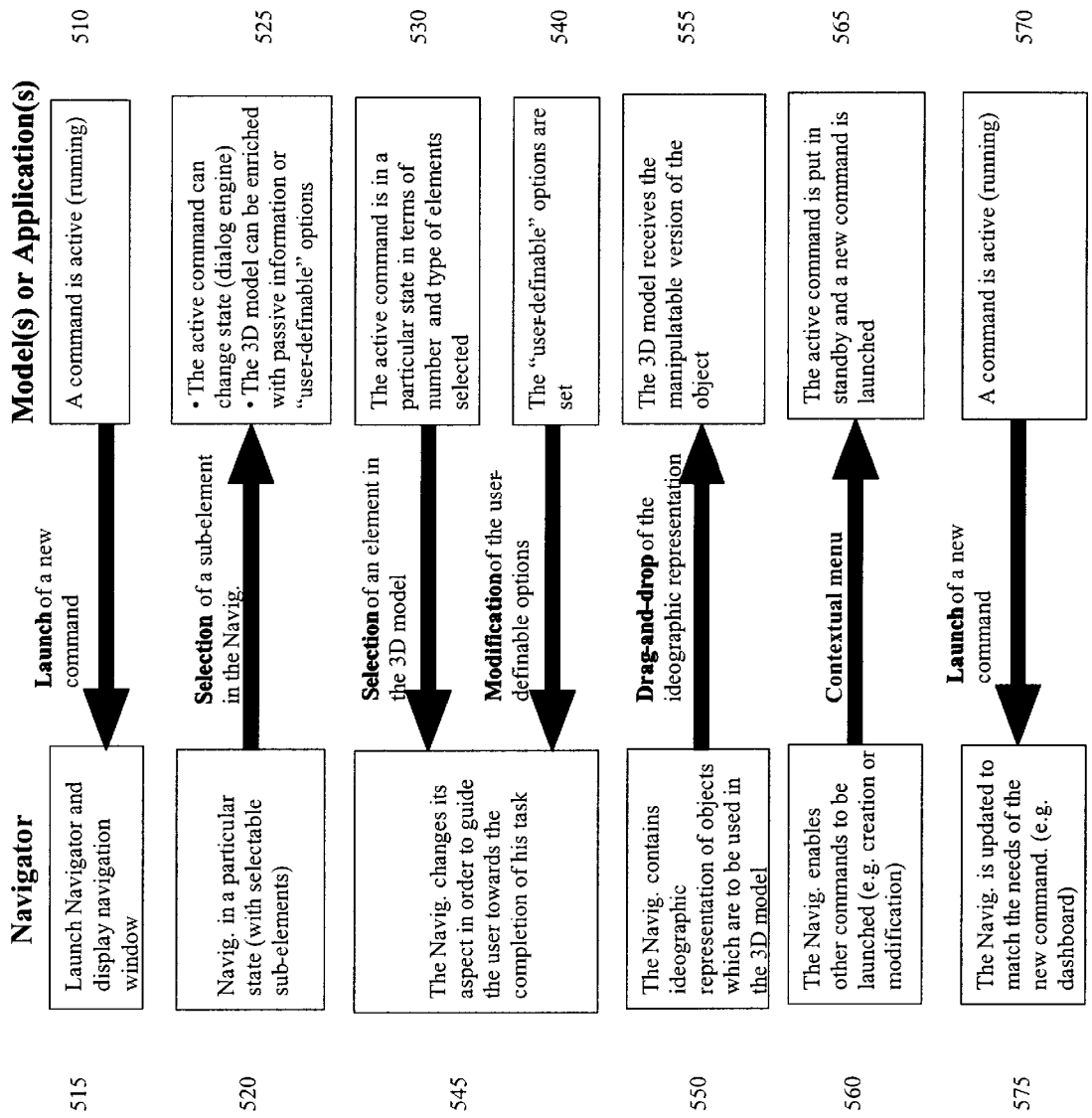
FIG. 5 is a chart which summarizes the various interactions which can take place between the contextual navigator and the command processor.

FIG. 5 is a chart which summarizes the various interactions which can take place between the contextual navigator and the command processor. The arrows between elements represent communication which can be handled by the navigator command state machine interface 40. However, and as will be recognized by those of skill in the art, the linkages between the command and navigation state machines can be directly implemented within the state machine functionality, thereby eliminating the need to provide an intermediary communication mechanism. Each of the various aspects in FIG. 5 will be discussed followed by a detailed example illustrating a sweep command implementation.

Turning to FIG. 5, when a user selects a given command in the model or application editing screen (510) the dynamic navigator is launched and the navigation window is displayed (515). When the navigator state machine is in a particular navigation state where the user can select particular command features or inputs to address (520), the selection of one of those features or inputs (e.g., by clicking on an active region in the navigation window) can cause the active command state machine to change to an appropriate corresponding input state. (525). In addition, the displayed object model can be "enriched" with passive information, such as icons, to indicate which of the main object features have previously been identified for use as the various commands inputs. When the command processor is placed in a particular state in which inputs can be selected (530), the navigator state machine changes to a state which corresponds to the active command state to thereby guide the user toward completing the selected task (545). The navigation window is similarly updated when various user definable options are set by the user in a command dialog (540).

In addition to selectable features, the navigation window can also contain iconographic representations of various functional objects which can be used in the object (550), such as a point selection or moving frame tool. The displayed object in the navigation window can be selected by the user and/or dragged into the active editing screen wherein the command processor will be instructed to provide a manipulatable version of the object (555). Similarly, the navigator module can provide options which permit a user to launch additional commands (560). When such an additional or subcommand is selected, e.g., via an appropriate contextual menu, the command processor is instructed to place the presently active command on standby and launch a new command, e.g., by starting its own state machine (565). Finally, the user can also select to activate a different command through the command interface (570). When the launch of a new command is detected, the navigation window is updated to display a context which corresponds to the new commands, e.g., by loading an appropriately corresponding navigator state machine and operating data.

Figure 6:
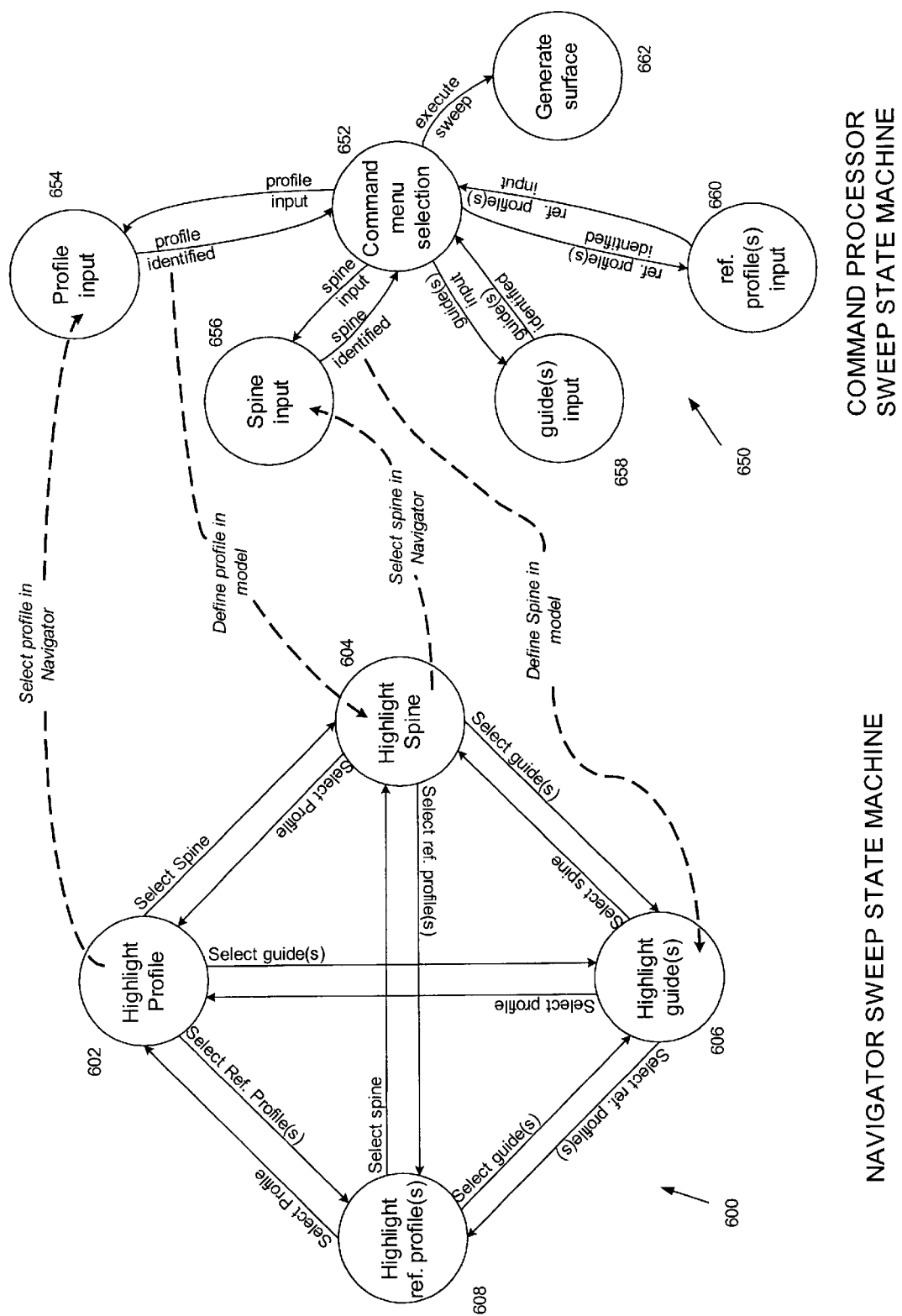
FIG. 6 is an illustration of a command processor state machine for a sweep command and the corresponding navigator state machine.

FIG. 6 is an illustration of a simplified command processor state machine 650 for a sweep command and the corresponding navigator state machine 600. With reference to the command state machine 650, the sweep command requires the input of a profile and a spine, which inputs can be identified when the command processor is in states 654 and 656, respectively. In addition, the user can specify one or more guides and reference profiles, represented by states 658 and 660. A central command menu selection state 652 is provided from which the program can jump to the states 654–660 for the various inputs. Transition links are shown between the central menu selection state 654 and the various input 654–660. These links are traversed when the user forms a particular action.

For example, when the command processor is in the menu selection state 652, and the user indicates they would like to define the profile for the sweep command, this indication moves the state machine into the profile input state 654. After the user has identified an appropriate curve feature in the graphical object to use as a profile, the profile definition action indicates that the state machine should return to the menu selection state 652, from which additional inputs can be addressed.

The navigator sweep state machine 600 has a plurality of states 602–608 which correspond to the primary input states 654–660 of the command sweep state machine 650. In particular, the sample navigator sweep state machine has a highlight profile state 602 when in which the sample profile feature 24.1 and corresponding icon 26.1 are highlighted. (see FIG. 2) There are a number of defined transitions between the various navigator states are activated as the user selects corresponding active areas in the navigation window. For example, when in the highlight profile state 602, the user can select an active area containing the spine feature or icon 24.2, 26.2, after which the navigator state machine moves into the highlight spine state 604 and the appropriate spine feature and icon are highlighted.

Also illustrated in FIG. 6 are sample linkages between the navigator state machine and the command state machine which are preferably implemented as part of the navigation command state machine interface 40 (FIG. 3). Use of the separate interface, as opposed to directly implementing the linkages in a combined navigator and command state machine environment, simplifies the process of adding dynamic navigation functionality to pre-existing software because the command state machines and associated functionality can remain largely undisturbed.

As illustrated, when the user selects the active region corresponding to the profile input of the command, the navigation state machine moves to the highlight profile state 602. This transition is detected and the command state machine 650 is shifted into the profile input state 654 to allow the user to identify a particular feature in the object model to use as the profile input. When the user identifies the profile, the input has been selected and the command state machine can move from the profile input state to the main menu state 652. (Other transitions are also possible depending various implementation and usability considerations). In this embodiment, when the user has identified the profile, the navigator state machine is shifted from its present state, here the highlight profile state 602, into the highlight spine state 604. This transition in the navigation state machine can subsequently be used to signal that the command state machine should be moved into the spine input state 656 so that the user can select a feature in the object model for use as the spine parameter.

As will be appreciated, through this mechanism, the user can be guided through the process of selecting each of the various parameters needed to execute the sweep command. As illustrated in this example, the linkage functionality between the navigator and command state machines 600, 650 drives the automatic transition from one state to the next and allows the user to progress through the various parameters until the command is in a state where it can be executed. In practice, the linkages and functionality behind the transition between the various states can be more sophisticated and include, for example, functionality which determines the appropriate state to select in the navigator and/or command processor based on which parameters of the command have already been defined. As will be appreciated, the particular implementation also depends on the nature and required and optional inputs for the various commands. In practice each command will have its own associated navigator state machine and appropriate linkage functionality implemented in the state machines or the navigator state machine interface 40.

Figure 7:
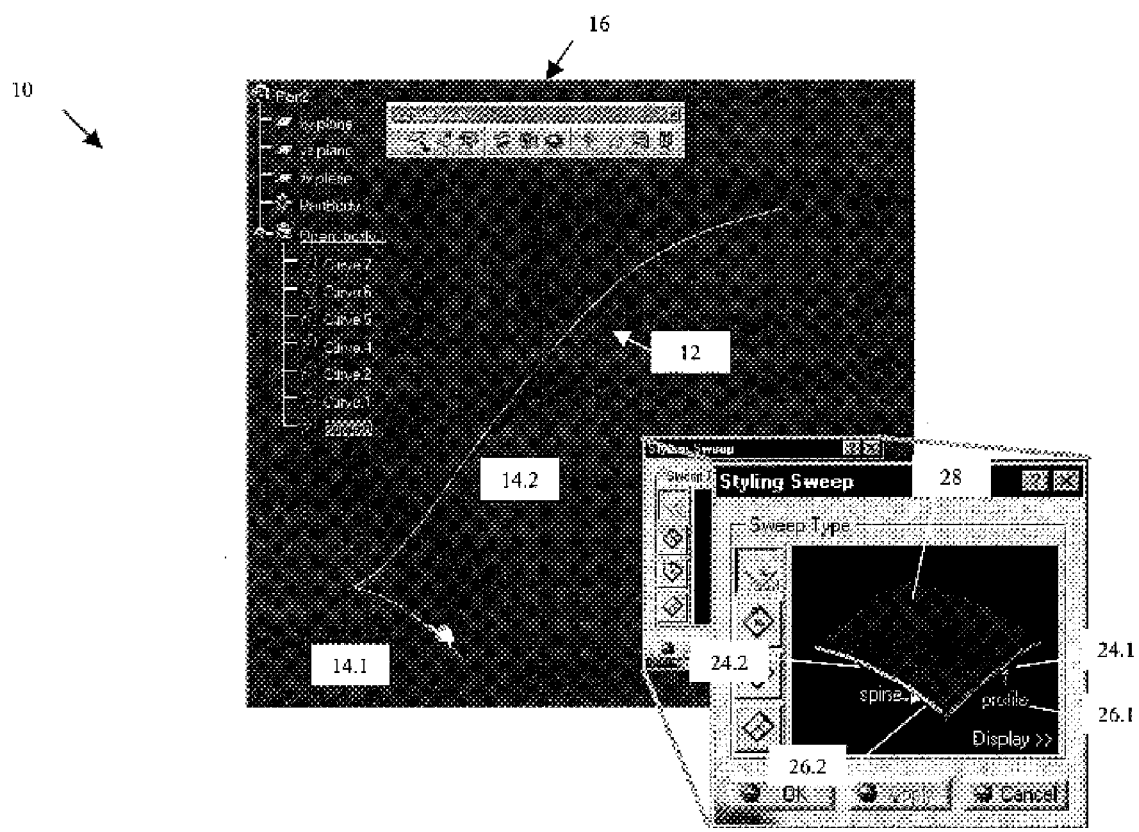
FIGS. 7–15 are sample screen images illustrating the dynamic and contextual command navigation with respect to a sweep command.

FIGS. 7 through 15 are sample screen images illustrating the selection of inputs for use in a sweep command and subsequent command execution. In. FIG. 7, the navigator state machine is in the highlight profile state 602 and the sample profile feature and icon 24.1, 26.1 are highlighted. In addition, the command processor has been placed in the profile input state 654 such that the user can identify a particular feature in the object model to use as the profile for the sweep command. In this example curve 14.1 has been selected for use as the profile.

Figure 8:
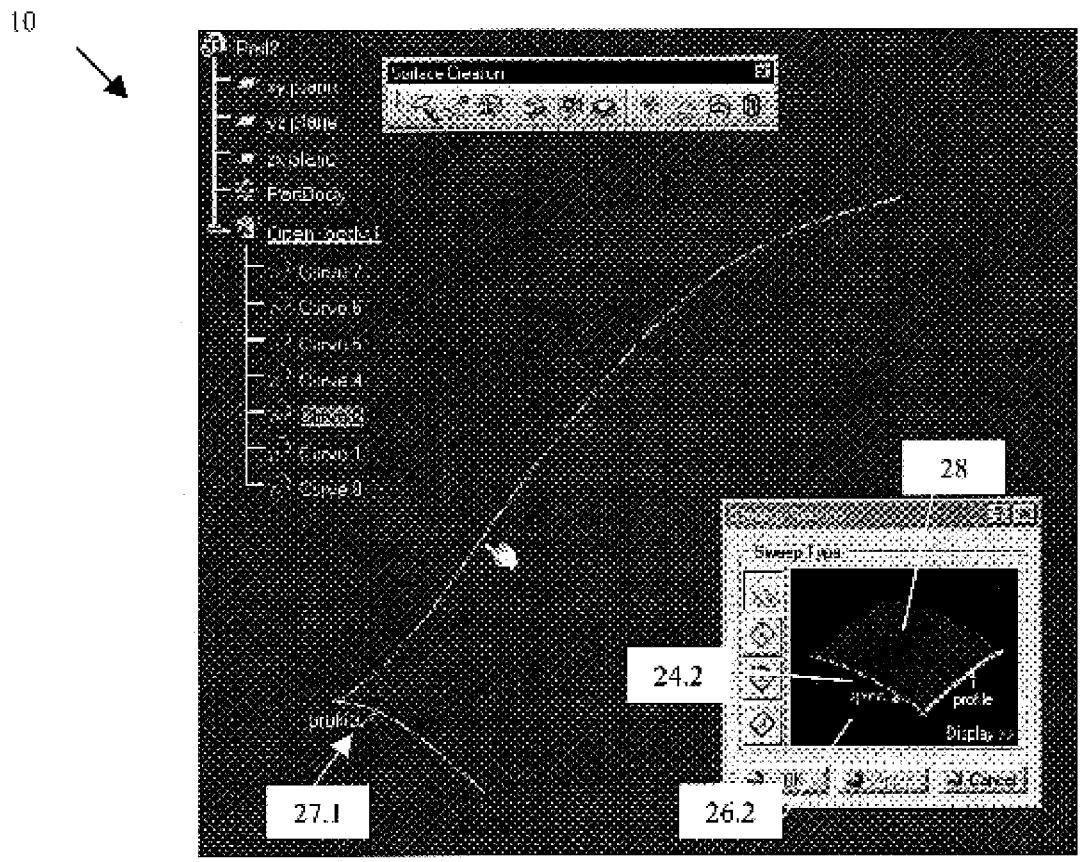
Figure 9:
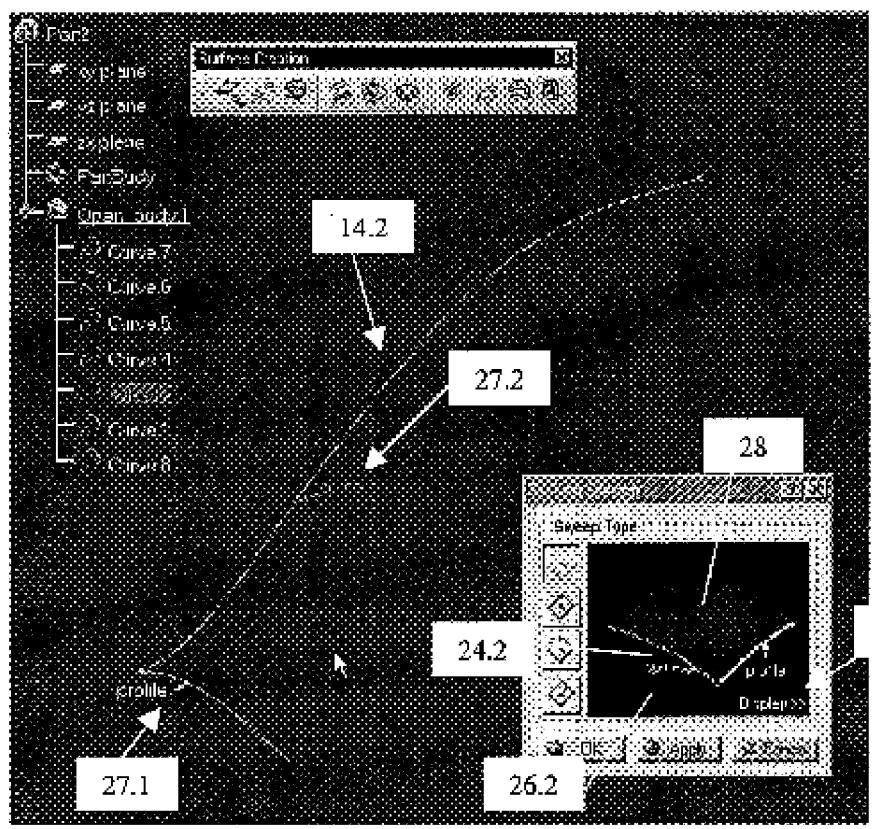

With reference to FIG. 8, once the profile attribute has been defined, the navigation state machine moves to the highlight spine state 604 and the sample spine feature and icon 24.2, 26.2 are highlighted in the navigation window. As illustrated in FIG. 6, when the navigator moves into the highlight spine state 604, the command processor state machine is shifted to the corresponding spine input state 656 and the user is permitted to select a curve in the object model to use as the spine for the sweep command. In addition, and according to a further aspect of the invention, informational information, such as a copy of the selected input icon 26.1 from the navigation window can be placed adjacent to the feature in the object model selected for use as that input. In FIG. 8, for example, a profile icon or label 27.1 has been added to curve 14.1 indicating that the user has selected this curve for use as the profile. In this example, and as shown in FIG. 9, the user has selected curve 14.2 for use as the spine and a copy of the spine icon or label 27.2 is shown in the main editing screen to indicate this choice.

Figure 10:
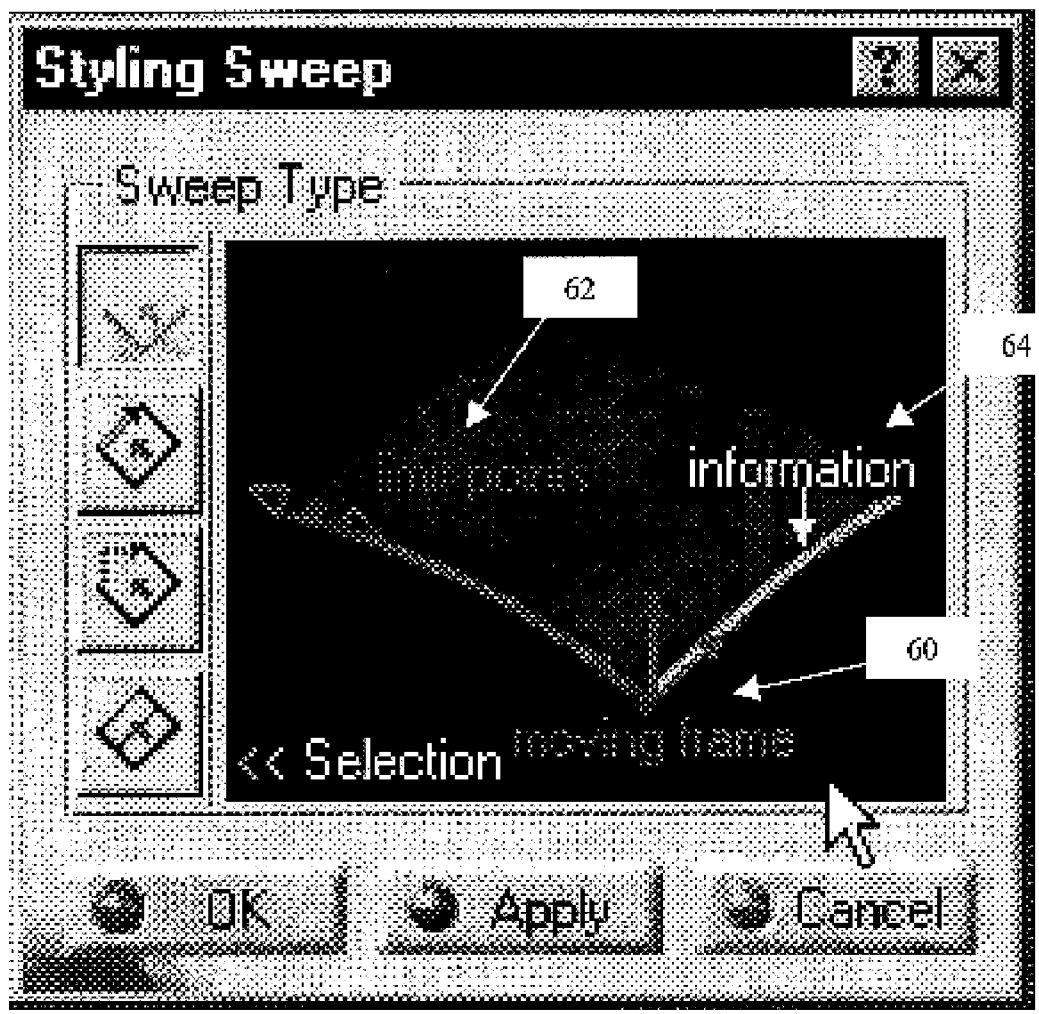

At this in the process, because the spine and profile have been defined, the user can execute the basic sweep command. However, additional functionality can also be provided as part of the sweep command environment and this functionality can also be represented in the navigation interface either directly in the main navigation window, or through a secondary window which can be accessed by an appropriate option button. In the preferred embodiment, a display button 50 is provided, the selection of which brings up a secondary display window (replacing or separate from the original window) in which, in this example, features for controlling the manner in which the sweep command is applied or displayed. These features are illustrated in FIG. 10.

In particular, there are shown on the sample object model in the navigation window a moving frame icon 60 for controlling the profile evolution law which sweeps along the spine, a limit point icon 62 for use in controlling the end point of the swept profile, and an information icon 64 for use in controlling the display of reference information in the graphical editing window. Various other options can also be provided depending on the type command selected and how that command is implemented. It should be noted that because these options are used to affect the manner in which the sweep command itself is executed, as opposed to providing inputs which define the basis for the sweep itself, these option selections will generally not have a corresponding state in the command state machine. Instead, selection of various command options can be managed from within the primary command menu selection state 652 (FIG. 6) or a separate option input state (not shown) in which all of the various options can be processed. Other variations are also possible.

Figure 11:
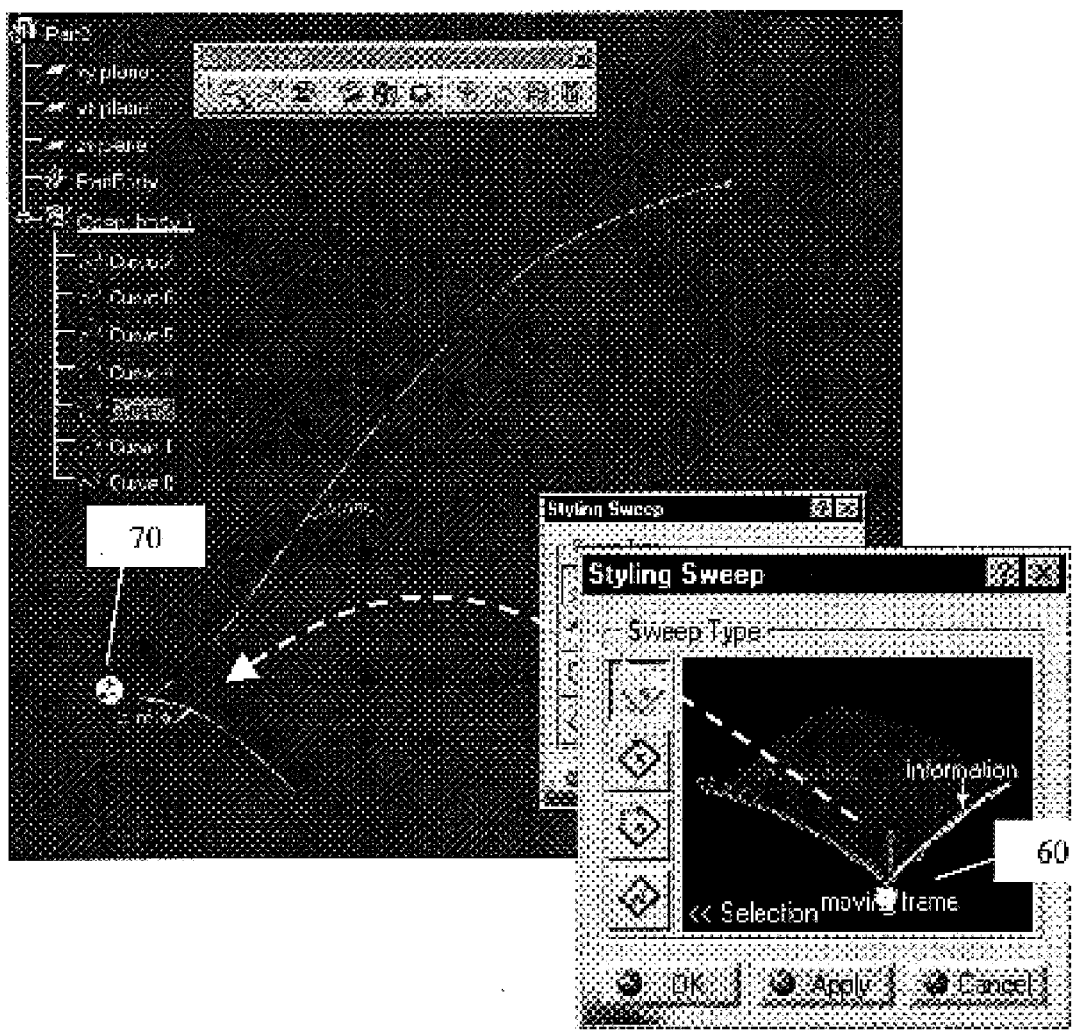

The moving frame option of the sweep command permits the user to visualize the manner in which the swept surface will evolve as the profile is swept along the spine. As shown in FIG. 11, and according to a further aspect of the invention, when the user selects an option icon, such as a moving frame icon, in the navigation window, a corresponding icon 70 is created in the editing screen. By sliding the icon 70 along the spine curve 14.2 the user can select particular points along the spine and visualize how the swept surface will be created at that point.

Figure 12:
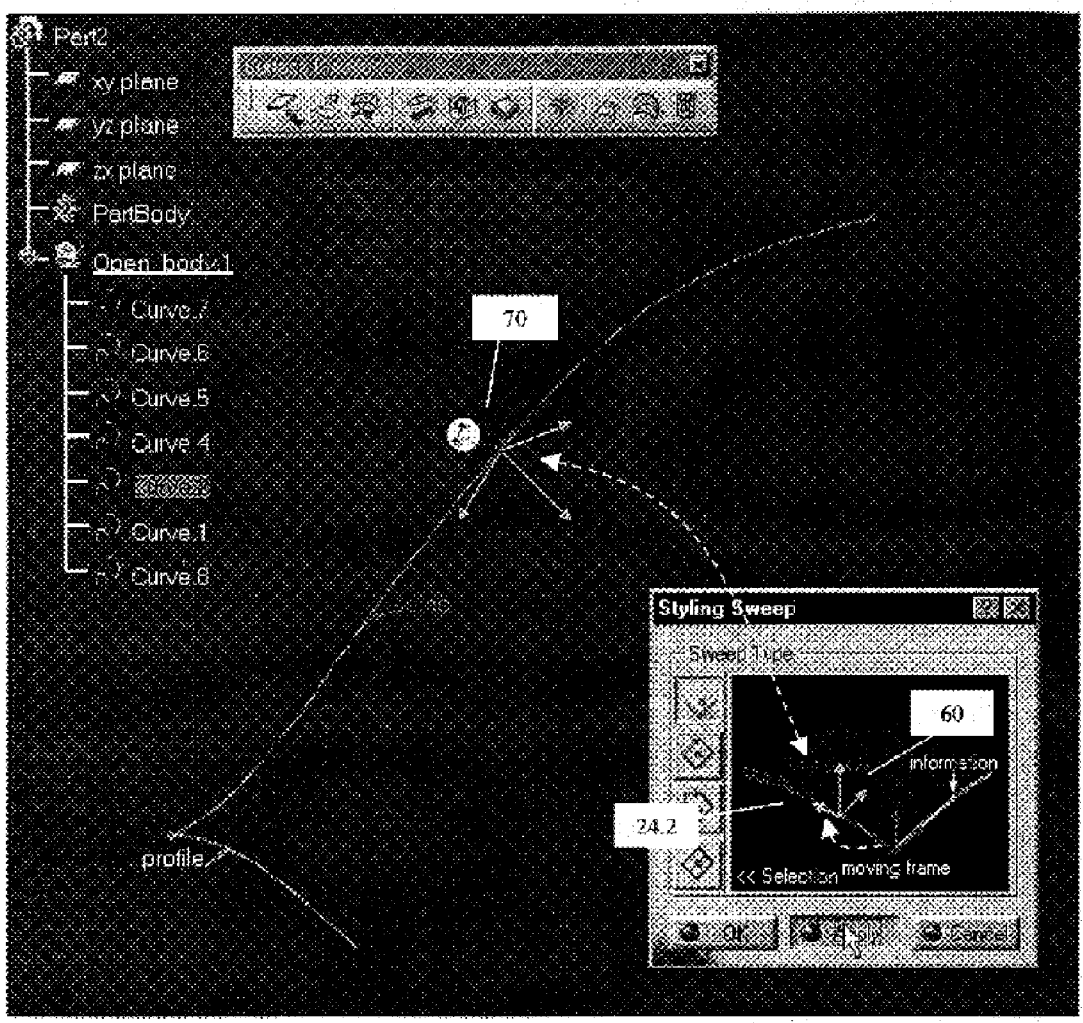

In one embodiment, and as shown in FIG. 12, the icon 70 can be moved along the surface by directly "dragging" the icon using the mouse in the main editing window. According to a further aspect of the invention, as the icon 70 is moved along the spine 14.2, the position of the icon 60 in the navigation window along the sample spine curve 24.2 is updated in a proportional manner relative to the position of the moving frame selector 70. Preferably, the user can also position the selector 70 by dragging the icon 60 in the navigation window along the spine curve 24.2 wherein the navigation system will translate that motion into a corresponding motion of the icon 70. This feature advantageously allows a user to easily select a point along a complex curve by maneuvering a selector along the simpler sample curve in the navigation menu. Suitable procedures for activating a main editing feature and placing a corresponding icon, such as moving frame icon 70, in response to a selection of the corresponding navigation icon 60, and coordinating the motion between the two in the respective displays will be known to those of skill in the art.

Figure 13:
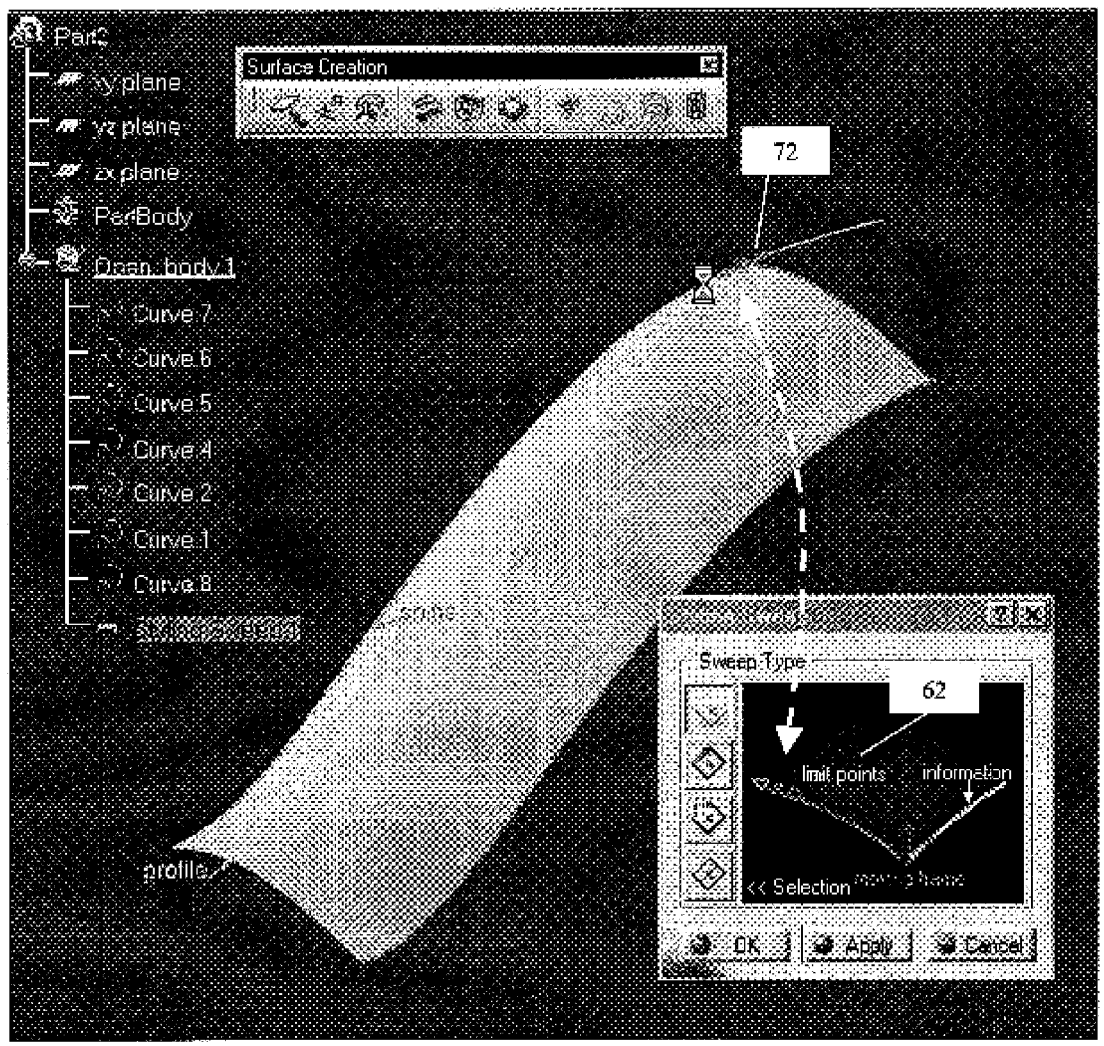

Similarly, and with reference to FIG. 13, the user can select limit point icon 62, upon which a corresponding limit point selection icon or handle 72 can be displayed in the main window. The position of the limit points used during the sweep command can be selected by dragging the navigation icon 62 or main icon 72 along the corresponding curve and the position of the other icon will be updated accordingly.

Figure 14:
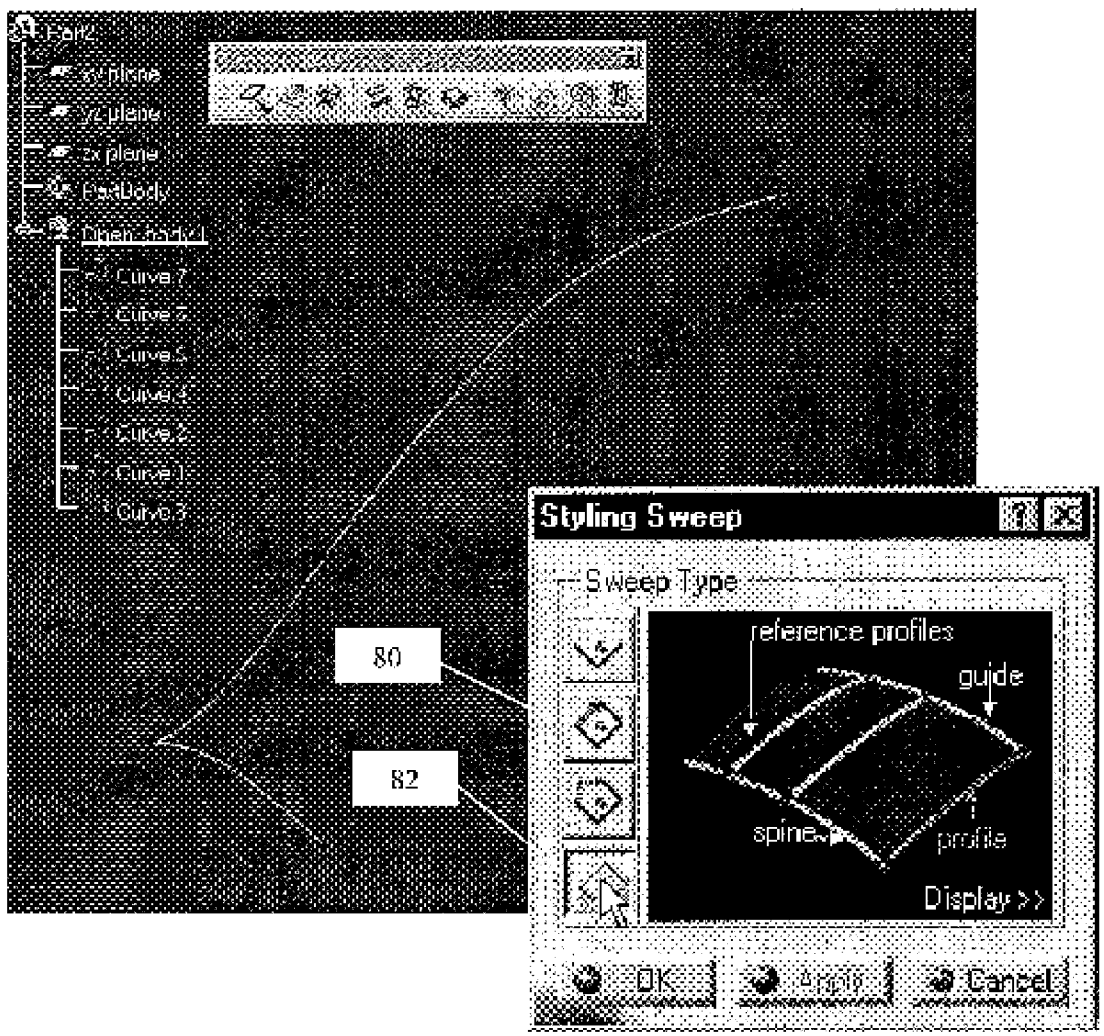

Depending on the complexity of the implemented sweep command, various other options may be available. For example, as shown in FIG. 14, the user can select, e.g., through an appropriate option button 80 in the navigation window, a sweep in which a spine profile and a guide are used. Similarly, a further option button 82 can be provided to permit the user to select a navigation window for a sweep in which a spine profile and one or more guides and reference profiles can be selected. The navigation window appropriate for this version of the sweep command is illustrated in FIG. 14 and corresponds generally to the sweep command processor state machine 650 illustrated in FIG. 6.

Figure 15:
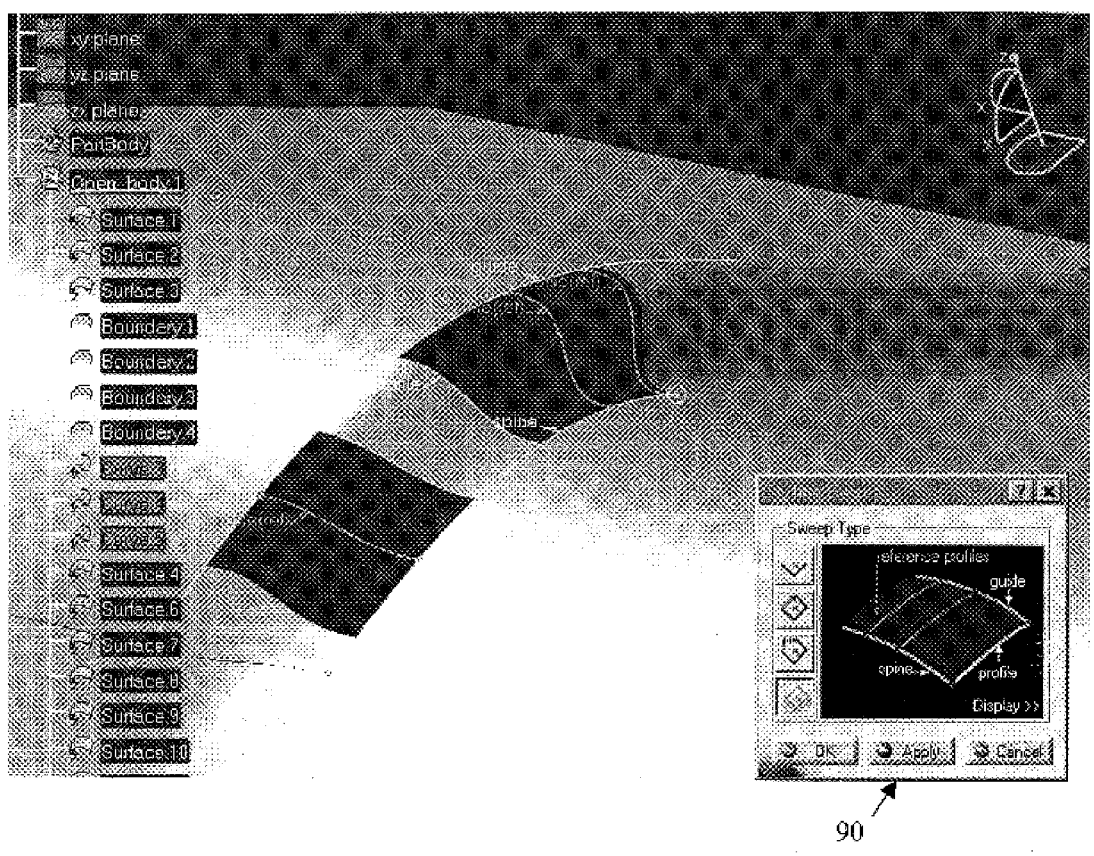

Finally, once all of the desired parameters and options have been specified by the user, either directly in the command input or via the interactive navigation system described herein, the user can execute the command by, for example, selecting an apply button 90, after which the sweep command will be executed and the swept surface created accordingly, as shown in FIG. 15.

While various aspects of the invention have been disclosed and described herein with particular reference to an example sweep command, the overall principles of dynamic and contextual navigation can be applied to a wide variety of editing commands. Advantageously, the dynamic and contextual navigation features allow a user to quickly and easily visualize the purpose of a command and understand the purpose of the various required and optional input options and parameters for that command. Depending on the application, the sample objects and features shown in the navigation window can be predefined two dimensional objects or generated on the fly. Depending on the desired complexity of the system, the complexity of the applied command, it may be more appropriate to provide a sample navigation object and associated features and icons in a three dimensional view and provide the user with the ability to manipulate the sample, e.g., by zooming, rotating and translating it. Various other changes and modifications to the particular form and implementation of the dynamic navigation console and interface as well as methodology can be made without departing from the spirit and scope of the invention.

What is claimed is:

1. A method for aiding a user of a graphical object editor in defining a plurality of inputs for a selected command, the command being processed by a command processor and applied to a main object model comprising at least one model feature, the method comprising the steps of:

detecting the selection of the command;

in response to the detection of a command selection, presenting a navigation console and displaying in the navigation console a sample object representative of the command inputs, the sample object having active regions associated with respective command inputs, each region comprising at least one of a sample feature associated with the respective command input and an icon representative of the respective input;

upon selection of a region in the navigation console associated with a particular command input, placing the command processor in a state to receive a definition of a feature in the main object model for use as the particular command input.

2. The method of claim 1, wherein the icon comprises a label indicating the name of the associated command input.

3. The method of claim 1, wherein the icon comprises an image representing the associated command input.

4. The method of claim 1, further comprising the step of, upon selection of a region in the navigation console associated with a sub-command, opening a navigation model associated with that sub-command.

5. The method of claim 1, wherein at least one region is associated with a contextual menu, the method further comprising the step of, upon selection of a region in the navigation console associated with a contextual menu, displaying the contextual menu.

6. The method of claim 1, further comprising the steps of:
providing a navigation state machine having a plurality of states associated with respective command inputs;
when in a particular navigation state:
highlighting in the navigation console at least a portion of the region associated with the respective command input, and
placing the command processor in a corresponding command input state.

7. The method of claim 6, further comprising the step of:
in response to the identification of a feature in the main object model for use as the particular command input, placing the navigation state machine in a subsequent navigation state.

8. The method of claim 6, further comprising the step of:
in response to the user placing the command processor in a particular command input state, placing the navigation state machine in the associated navigation state.

9. A system for aiding a user of a graphical object editor in defining a plurality of inputs for a selected command to be applied to a main object model comprising:
a command processor comprising a command state machine for the selected command, the command state machine having a plurality of states associated with the entry of respective command inputs; and
a navigation engine comprising a navigation state machine for the selected command, the navigation state machine having a plurality of navigation states associated with respective command inputs;
the navigation engine being configured to:
in response to selection of a command, display in a navigation console a sample object representative of the command inputs for the selected command, the sample object having active regions associated with respective command inputs, each region comprising at least one of a sample feature associated with the respective command input and corresponding navigation state and an icon representative of the respective input; and
upon selection of a region in the navigation console associated with a particular command input, place the navigation state machine in a navigation state corresponding to the particular command input and the command processor in a state to receive a definition of a feature in the main object model for use as the particular command input.

10. The system of claim 9, wherein the navigation engine is further configured to, when in a particular navigation state, highlight in the navigation console at least a portion of the region associated with the particular navigation state.

11. The system of claim 9, wherein each icon comprises a label indicating the name of the associated command input.

12. The system of claim 9, wherein the navigation engine is further configured to, in response to the identification of a feature in the main object model for use as the particular command input, placing the navigation state machine in a subsequent navigation state.

13. The system of claim 9, wherein the navigation engine is further configured to, in response to the user placing the command processor in a particular command input state, place the navigation state machine in the associated navigation state.

14. The system of claim 9, wherein the navigation engine further comprises a navigation command state machine interface configured to adjust the state position in one of the navigation and command state machines in response to a change in state position in the other of the navigation and command state machines.

15. The system of claim 9, wherein the selected command has at least one option, which option can be defined by a movable selector in a main editing screen;
the navigation engine being further configured to:
display in the navigation console a movable navigation icon corresponding to the movable selector; and
coordinate the position of the movable selector relative to a feature in the main object model with the position of the movable navigation icon relative to a sample feature in the sample object.

16. The system of claim 9, wherein the selected command has at least one option, which option can be defined by a movable selector in a main editing screen;
the navigation engine being further configured to:
display in the navigation console a movable navigation icon corresponding to the movable selector; and
adjust the position of the movable navigation icon relative to a sample feature in the sample object in response to an adjustment of the position of the movable selector relative to a feature in the main object model.

17. The system of claim 9, wherein the selected command has at least one option, which option can be defined by a movable selector in a main editing screen;
the navigation engine being further configured to:
display in the navigation console a movable navigation icon corresponding to the movable selector; and
adjust the position of the movable selector relative to a feature in the main object model in response to an adjustment of the position of the movable navigation icon relative to a sample feature in the sample object.

18. The system of claim 9, wherein at least one region is associated with a sub-command, the navigation engine being further configured to, upon selection of a region in the navigation console associated with a sub-command, open a navigation model associated with that sub-command.

19. The system of claim 9, wherein at least one region is associated with a contextual menu, the navigation engine being further configured to, upon selection of a region in the navigation console associated with a contextual menu, display the contextual menu.

20. In system for editing a graphical object comprising a command processor having a command state machine for a selected command to be applied to a main object model, the command state machine having a plurality of states associated with the entry of respective command inputs; the improvement comprising:

a navigation engine comprising a navigation state machine for the selected command, the navigation state machine having a plurality of navigation states associated with respective command inputs;

the navigation engine being configured to:

in response to the selection of a command, display in a navigation console a sample object representative of the command inputs for the selected command, the sample object having active regions associated with respective command inputs, each region comprising at least one of a sample feature associated with the respective command input and corresponding navigation state and an icon representative of the respective input; and upon selection of a region in the navigation console associated with a particular command input, place the navigation state machine in a navigation state corresponding to the particular command input and the command processor in a state to receive a definition of a feature in the main object model for use as the particular command input.

21. The system of claim 20, wherein the navigation engine is further configured to, when in a particular navigation state, highlight in the navigation console at least a portion of the region associated with the particular navigation state.

22. The system of claim 20, wherein each icon comprises a label indicating the name of the associated command input.

23. The system of claim 20, wherein the navigation engine is further configured to, in response to the identification of a feature in the main object model for use as the particular command input, placing the navigation state machine in a subsequent navigation state.

24. The system of claim 20, wherein the navigation engine is further configured to, in response to the user placing the command processor in a particular command input state, place the navigation state machine in the associated navigation state.

25. The system of claim 20, wherein the navigation engine further comprises a navigation command state machine interface configured to adjust the state position in one of the navigation and command state machines in response to a change in state position in the other of the navigation and command state machines.

26. The system of claim 20, wherein the selected command has at least one option, which option can be defined by a movable selector in a main editing screen;

the navigation engine being further configured to:
display in the navigation console a movable navigation icon corresponding to the movable selector; and
coordinate the position of the movable selector relative to a feature in the main object model with the position of the movable navigation icon relative to a sample feature in the sample object.

27. The system of claim 20, wherein the selected command has at least one option, which option can be defined by a movable selector in a main editing screen;

the navigation engine being further configured to:
display in the navigation console a movable navigation icon corresponding to the movable selector; and
adjust the position of the movable navigation icon relative to a sample feature in the sample object in response to an adjustment of the position of the movable selector relative to a feature in the main object model.

28. The system of claim 20, wherein the selected command has at least one option, which option can be defined by a movable selector in a main editing screen;

the navigation engine being further configured to:
display in the navigation console a movable navigation icon corresponding to the movable selector; and
adjust the position of the movable selector relative to a feature in the main object model in response to an adjustment of the position of the movable navigation icon relative to a sample feature in the sample object.

29. The system of claim 20, wherein at least one region is associated with a sub-command, the navigation engine being further configured to, upon selection of a region in the navigation console associated with a sub-command, open a navigation model associated with that sub-command.

30. The system of claim 20, wherein at least one region is associated with a contextual menu, the navigation engine being further configured to, upon selection of a region in the navigation console associated with a contextual menu, display the contextual menu.

* * * * *